(12) United States Patent
Nozaki (10) Patent No.: US 8,564,845 B2
(45) Date of Patent: Oct. 22, 2013

(54) IMAGE READING APPARATUS (75) Inventor: Mitsuhiro Nozaki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 427 days.

(21) Appl. No.: 13/071,362

(22) Filed: Mar. 24, 2011

(65) Prior Publication Data

US 2011/0242611 A1   Oct. 6, 2011

(30) Foreign Application Priority Data

Mar. 31, 2010   (JP) .................. 2010-083465

(51) Int. Cl.
    H04N 1/053   (2006.01)
(52) U.S. Cl.
    USPC ........... 358/437; 358/474; 358/468; 358/498; 399/371
(58) Field of Classification Search
    USPC ............... 358/401, 437, 474, 468, 496, 498; 399/367, 371
    See application file for complete search history.

(56) References Cited

U.S. PATENT DOCUMENTS

| 5,057,943 | A  | * | 10/1991 | Takahashi ............... 358/496 |
| 2006/0023269 | A1 | * | 2/2006 | Tsuchiya et al. ........... 358/498 |
| 2007/0104524 | A1 | * | 5/2007 | Suzuki ................... 399/367 |
| 2008/0106773 | A1 |   | 5/2008 | Akiyama |
| 2010/0118353 | A1 | * | 5/2010 | Inadome ................. 358/474 |
| 2012/0002252 | A1 | * | 1/2012 | Kubo et al. .............. 358/498 |

FOREIGN PATENT DOCUMENTS

| JP | H08-228267 A | 9/1996 |
| JP | 2007-201672 A | 8/2007 |
| JP | 2008-118368 A | 5/2008 |
| JP | 2008-129063 A | 6/2008 |
| JP | 2009-141523 A | 6/2009 |

OTHER PUBLICATIONS

Japan Patent Office, Notice of Reasons for Rejection for Japanese Patent Application No. 2010-083465 (counterpart to above-captioned patent application), dispatched Jan. 31, 2012.

* cited by examiner

Primary Examiner — Kimberly A Williams
(74) Attorney, Agent, or Firm — Baker Botts L.L.P.

(57) ABSTRACT

An image reading apparatus including a reading unit that reads a document as an object to be read in a main scanning direction; a conveyance unit that conveys one of the reading unit and the object to be read as an object to be conveyed in a sub-scanning direction; a detecting unit that detects a position of the object to be conveyed; a control unit that controls conveyance of the object to be conveyed, based on the position of the object to be conveyed and a preset target position trajectory; a specifying unit that specifies, based on the target position trajectory, the position of the object to be conveyed at a time when a period of invalidation or interruption of reading operation by the reading unit is started. The reading operation is invalidated or interrupted when a predetermined interruption condition is satisfied.

20 Claims, 8 Drawing Sheets

IMAGE READING APPARATUS

CROSS-REFERENCE TO RELATED APPLICATIONS

This application claims the benefit of Japanese Patent Application No. 2010-083465 filed Mar. 31, 2010 in the Japan Patent Office, the disclosure of which is incorporated herein by reference.

BACKGROUND

This invention relates to an image reading apparatus.

Conventionally known image reading apparatus are of flatbed (FB) type and of auto document feeder (ADF) type. The reading image apparatus of FB type reads a document by conveying in a sub-scanning direction a line sensor that is able to read an image in a main scanning direction. The reading image apparatus of ADF type reads a document by fixing a line sensor and conveying a document in a sub-scanning direction. In these types of image reading apparatus, the document or the line sensor is conveyed so that a relative position between the document and the line sensor is changed at a constant speed. During the constant speed conveyance, the line sensor executes reading operation per predetermined time period and generates line image data which is the read image data per line. Each of the generated line image data is combined with one another so as to generate the read image data representing a read image of the document.

It is also known that, in the above-described image reading apparatus, the line image data is temporarily accumulated in a buffer and then transferred to the downstream. In the case that the buffer becomes or is likely to become full due to process delay or for other reasons in the downstream, document reading based on the constant speed conveyance is temporarily interrupted. Then, the position where the document reading has been interrupted is stored and held. When a free space is created in the buffer, the document reading based on the constant speed conveyance is restarted from the interrupted position. In order to accurately specify the interrupted position, a configuration is known which provides a line start signal to the line sensor in synchronization with an encoder signal of an encoder which outputs the encoder signal in accordance with the move of the line sensor.

SUMMARY

In order to specify the interrupted position with precision by making the line start signal synchronized with the encoder signal, as in the conventional technique, it is necessary that a reading resolution by the line sensor (a distance in a sub-scanning direction per line) is consistent with an encoder resolution (a distance per pulse). When a speed of an object to be conveyed is fluctuated due to a control error, a cycle of the encoder signal is fluctuated and so is an output timing of the line start signal. For this reason, image degradation of the read image data occurs.

In one aspect of the invention, it would be desirable that the interrupted position can be specified with high precision, without synchronization of the line start signal with the encoder signal.

An image reading apparatus in one aspect of the present invention includes a reading unit, a conveyance unit, a position detecting unit, a conveyance control unit and a position specifying unit. The reading unit reads a document as an object to be read in a main scanning direction. The conveyance unit conveys one of the reading unit and the object to be read in a sub-scanning direction as an object to be conveyed. The position detecting unit detects a position of the object to be conveyed. The conveyance control unit controls conveyance of the object to be conveyed by the conveyance unit, according to a preset target position trajectory, based on the position of the object to be conveyed detected by the detecting unit and the target position trajectory. The position specifying unit specifies, based on the target position trajectory, the position of the object to be conveyed at a time when a period of invalidation or interruption of reading operation by the reading unit is started. The reading operation is invalidated or interrupted when a predetermined interruption condition is satisfied.

According to this image reading apparatus, based on information of the target position trajectory from a conveyance start position, a conveyance position (hereinafter, referred to as an "interrupted position" as well) of the object to be conveyed is specified at the time when the reading operation is invalidated or interrupted. Accordingly, even if the position detecting unit is configured only to be able to detect the position only at discrete timings (such as, based on the encoder signal and others), the interrupted position can be specified with precision based on the target position trajectory.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
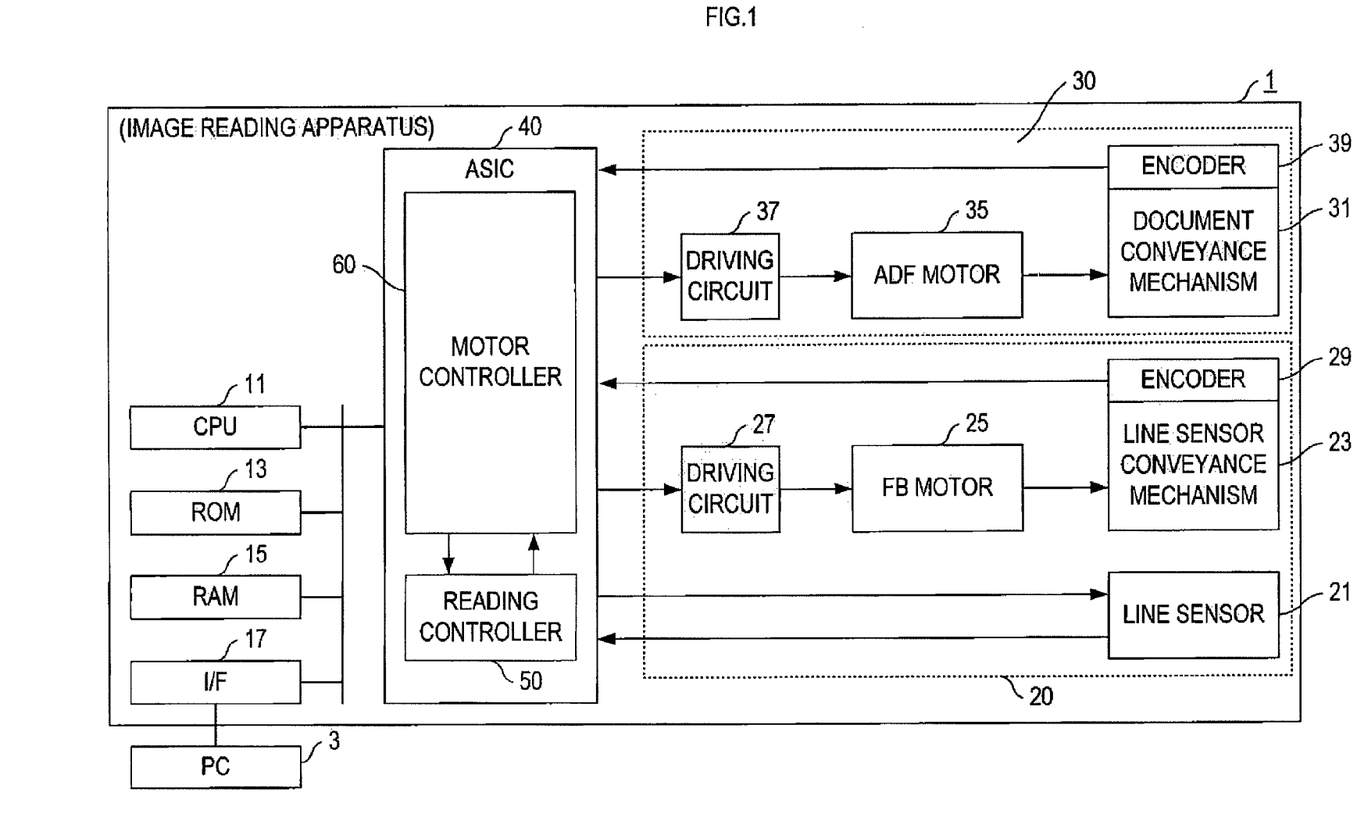
FIG. 1 is a block diagram showing a constitution of an image reading apparatus 1.

As shown FIG. 1, an image reading apparatus 1 of the present embodiment includes a CPU 11, a ROM 13, a RAM 15, an interface 17, a flatbed (FB) reader 20, an auto document feeder (ADF) 30, and an ASIC 40. The ROM 13 stores programs executed by the CPU 11. The RAM 15 is used as a work area when the CPU 11 executes the programs. The interface 17 allows communication with an external personal computer (PC). The FB reader 20 conveys a line sensor 21 to read a document to be read. The ASIC 40 drives and controls the FB reader 20 and the ADF 30.

In the image reading apparatus 1, the CPU 11, based on reading instructions provided from the external PC 3 via the interface 17, executes an integrated control process pertaining to document reading. The CPU 11 sets operation parameters to the ASIC 40 to start the ASIC 40. Examples of the operation parameters are those that indicate reading modes, reading resolutions, reading areas, and so on. As the reading modes, there are an ADF reading mode and an FB reading mode. In the ADF reading mode, the document to be read is read by arranging the line sensor 21 in a fixed manner and conveying a document to be read, thereby changing a relative position between the line sensor 21 and the document. In the FB reading mode, the document is read by conveying the line sensor 21, thereby changing a relative position between the line sensor 21 and the document placed on a platen glass 103A.

The ASIC 40 controls the FB reader 20 and the ADF according to one or a plurality of the aforementioned operation parameters, and, while changing the relative position between the document to be read and the line sensor 21, the ASIC 40 makes the line sensor 21 execute a periodic reading operation. The line sensor 21 generates line image data indicating a result of reading one line of the document per the reading operation. The ASIC 40 applies shading correction (which is a correction by adjusting variation in brightness due to the optical property and imaging property to unify the brightness of an image), etc. to the line image data for one or a plurality of lines (hereinafter, one or a plurality of line image data is merely expressed as the line image data) generated as such and outputs the corrected line image data. The corrected line image data outputted from the ASIC 40 is stored in the RAM 15.

The CPU 11 transmits the corrected line image data stored in the RAM 15 sequentially to the PC 3 via the interface 17. Or, the CPU 11 transmits the corrected line image data stored in the RAM 15 after accumulated as much as one sheet of document to the PC 3 via the interface 17. In this manner, the CPU 11 provides the PC 3 with read image data which indicates the result of reading the document. The read image data is composed of a group of line image data.

Next, a description will be given concerning detailed constitutions of the FB reader 20, the ADF 30 and the ASIC 40. The FB reader 20 includes the line sensor 21, a line sensor conveyance mechanism 23, an FB motor 25, a driving circuit 27, and an encoder (hereinafter, referred to as a "FB encoder 29" as well). The line sensor 21 reads the document to be read in a main scanning direction. The conveyance mechanism 23 conveys the line sensor 21. The FB motor 25 is a direct current motor that supplies power to the conveyance mechanism 23. The driving circuit 27 drives the FB motor 25. The FB encoder 29 is installed in a power transmission mechanism which transmits power from the FB motor 25 to the line sensor 21. The FB encoder 29 outputs a pulse signal (encoder signal) corresponding to the move of the line sensor 21 in a sub-scanning direction. The FB encoder 29, for example, may be a rotary encoder.

Figure 2:
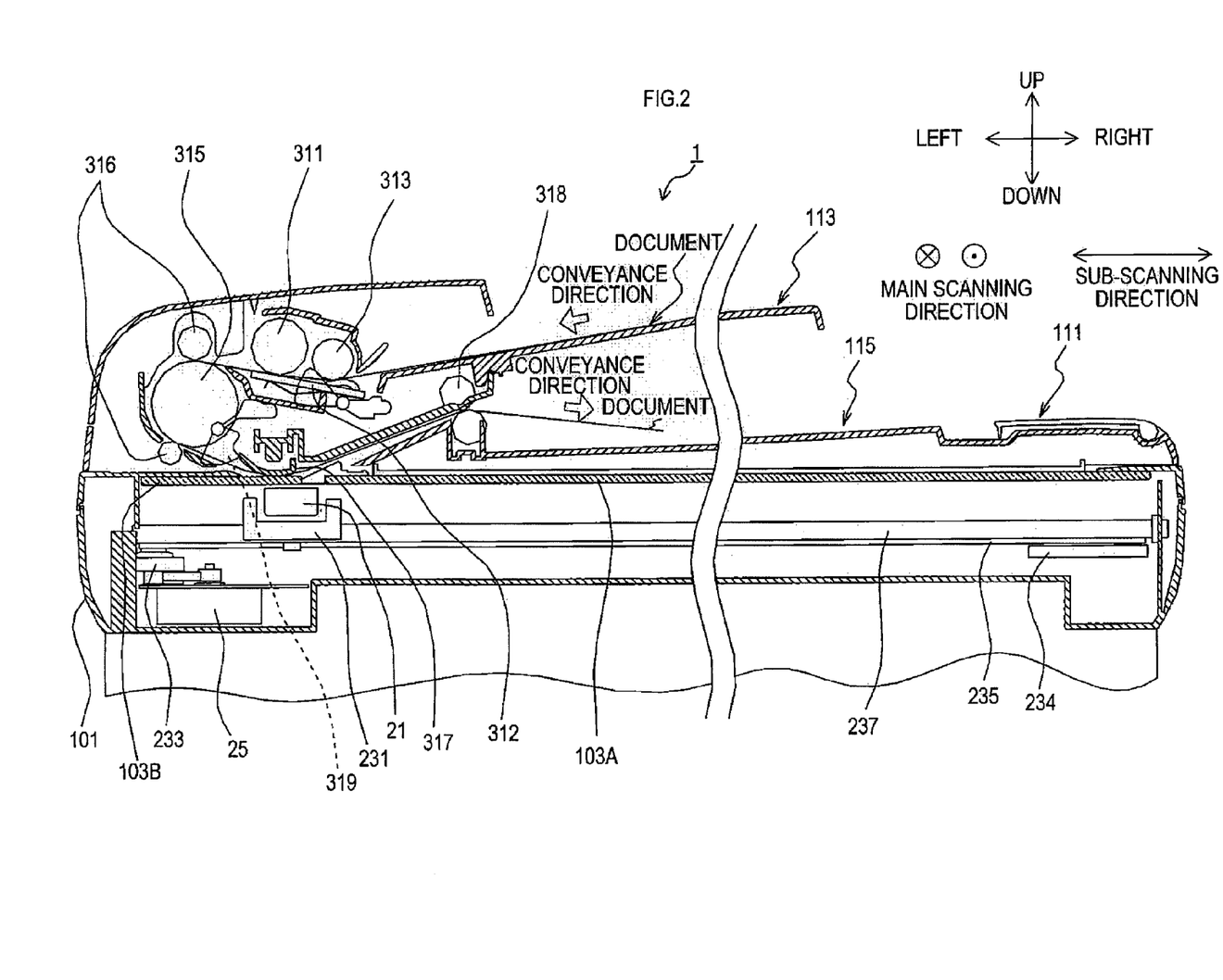
FIG. 2 is a cross sectional view showing a mechanical constitution of the image reading apparatus 1.

The conveyance mechanism 23, as shown in FIG. 2, is provided inside a lower case 101 of the image reading apparatus 1. On a top surface side of the lower case 101 of the image reading apparatus 1 (in FIG. 2, an up and down direction is defined as a top and a bottom on the drawing sheet, and a right and left direction (sub-scanning direction) is defined as the right and the left on the drawing sheet), transparent platen glasses 103A and 103B are provided. On a top surface of the platen glass 103A, a document to be read is placed manually by a user in the FB reading mode. The platen glass 103B is used in the ADF reading mode. In the ADF reading mode, the line sensor 21 is arranged in a fixed manner in an area below the platen glass 103B.

The conveyance mechanism 23 is provided in such a manner as to be able to convey, in the sub-scanning direction, the line sensor 21 which extends in the main scanning direction, in an area below the platen glasses 103A and 103B. Particularly, the conveyance mechanism 23 is configured such that a carriage 231 mounting the line sensor 21 thereon is connected to a belt 235 wound around a driving pulley 233 and a driven pulley 234. To the driving pulley 233, the FB motor 25 is connected via a gear.

In the conveyance mechanism 23, the driving pulley 233 is rotated by the power received from the FB motor 25. In response to rotation of the driving pulley 233, the belt 235 and the driven pulley 234 are rotated to transmit power to the carriage 231 connected to the belt 235. The carriage 231 that receives the power is controlled to move only in the sub-scanning direction by a guide shaft 237, thereby moving in the sub-scanning direction. In response to the move, the line sensor 21 mounted on the carriage 231 is conveyed in the sub-scanning direction. The FB encoder 29, for example, is attached to a rotation shaft of the driving pulley 233 or of the FB motor 25 so as to output an encoder signal corresponding to the move of the line sensor 21 in the sub-scanning direction.

The ADF 30, as shown in FIG. 1, includes a document conveyance mechanism 31, an ADF motor 35, a driving circuit 37, and an encoder (hereinafter, referred to as an "ADF encoder" as well) 39. The ADF motor 35 is a direct current motor that supplies power to the conveyance mechanism 31. The driving circuit 37 drives the ADF motor 35. The ADF encoder 39 outputs a pulse signal (encoder signal) according to a distance of the document conveyed. The ADF encoder 39, for example, may be a rotary encoder.

The conveyance mechanism 31, as shown in FIG. 2, is provided in an upper case 111. The upper case 111 is rotatably provided to the lower case 101 of the image reading apparatus 1. The upper case 111 functions as a cover body that covers the top surface of the lower case 101 which includes the platen glasses 103A and 103B. The conveyance mechanism 31 provided in the upper case 111 includes a separation roller 311, a separation pad 312, and a suction roller 313. The separation pad 312 is arranged to face the separation roller 311 to apply a predetermined conveyance resistance to the document. The suction roller 313 sends out the document stacked in a document tray 113, provided in the upper case 111, to the separation roller 311.

The conveyance mechanism 31 further includes a main roller 315, a pair of pinch rollers 316, a document presser 317, a discharge roller 318, and a document sensor actuator 319. The main roller 315 applies a conveyance force to the document by converting a conveyance direction of the document conveyed from the separation roller 311 toward the side of the platen glass 103B. The pinch rollers 316 press the document against the main roller 315.

Each of the rollers 311, 313, 315 and 318 constituting the conveyance mechanism 31 receives power from the ADF motor 35 (see FIG. 1) to be rotated in conjunction with each other. The rollers 311, 313, 315 and 318 apply a force in the sub-scanning direction to the document so as to convey the document in an distance corresponding to the rotation amount of the rollers 311, 313, 315 and 318 from the document tray 113 to the discharge tray 115. The document presser 317 presses the conveyed document to the side of the platen glass 103B. The document sensor actuator 319 is arranged upstream of the document presser 317 and detects whether or not the document has passed by. The line sensor 21 is arranged below the document presser 317 and reads the document passing below the document presser 317 in the ADF reading mode.

The ADF encoder 39 (see FIG. 1) is installed in a power transmission mechanism (e.g., rotation shaft of the ADF motor 35) that transmits power from the ADF motor 35 (see FIG. 1) to the above-described rollers and outputs a pulse signal (encoder signal) corresponding to rotation of the ADF motor 35 and of the rollers. In the present embodiment, the image reading apparatus 1 detects the conveyance position of the document based on an on/off signal from the document sensor actuator 319 and an encoder signal outputted from the ADF encoder 39.

Figure 3:
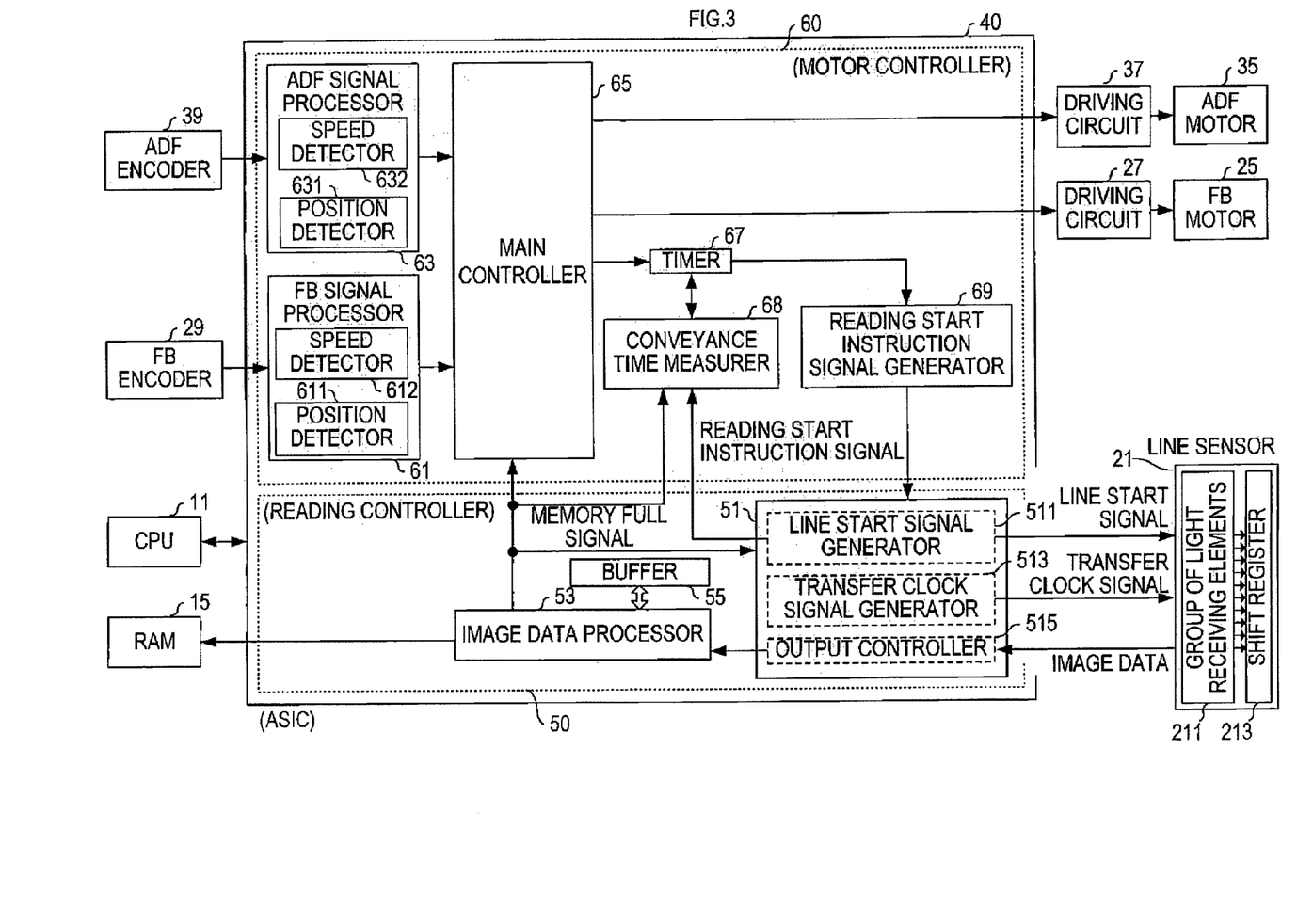
FIG. 3 is a block diagram showing an internal constitution of an ASIC 40.

Next, the detailed constitution of the ASIC 40 will be explained by way of FIG. 3. The ASIC 40 includes a reading controller 50 and a motor controller 60. The motor controller 60 drives and controls the FB motor 25 and the ADF motor 35. The reading controller 50 is provided with a reading front end 51, an image data processor 53 and a buffer 55. The reading controller 50 controls the line sensor 21 to control reading of the document.

The reading front end 51 is provided with a line start signal generator 511, a transfer clock signal generator 513, and an output controller 515. The signal generator 511 periodically outputs a line start signal at a cycle T0. The cycle (time) T0 depends on the reading resolution and is set in a not shown register. The line start signal is provided to the line sensor 21. The line sensor 21 is provided with a group of light receiving elements 211 and an analog shift register 213. The group of light receiving elements 211 includes a plurality of light receiving elements. Each of the light receiving elements constitutes one pixel. The analog shift register 213 is in size corresponding to the number of the light receiving elements. When the line start signal is provided from the reading front end 51 to the line sensor 21, the line sensor 21 transfers signal charge accumulated in each of the plurality of light receiving elements to the analog shift register 213. In other words, the line image data indicating a result of reading from when the previous line start signal is inputted until the present line start signal is inputted is stored in the analog shift register 213. The analog shift register 213 stores and holds signal charge information for one line provided from the group of light receiving elements 211 as the line image data. Also, the input of the line start signal resets the signal charge in each of the plurality of light receiving elements. Then, new reading operation is started which utilizes a photoelectric effect.

The signal generator 511 of the present embodiment outputs a line start signal exceptionally, regardless of whether or not the time T0 for one cycle has elapsed from when the last line start signal has been outputted, at the timing when a High signal is provided from the motor controller 60 to the reading front end 51 as a reading start instruction signal (hereinafter, referred to as a RSI signal). Thereafter, from the output of this line start signal, the signal generator 511 outputs a line start signal each time the time T0 elapses.

The signal generator 513, per input of the line start signal from the signal generator 511 to the line sensor 21, provides a transfer clock signal to the line sensor 21. The transfer clock signal makes the analog shift register 213 output the line image data (analog data corresponding to the signal charge). With the input of the transfer clock signal, the line image data stored in the analog shift register 213 is outputted to the output controller 515 during a period before the next line start signal is provided to the line sensor 21. Hereinafter, the period from when a line start signal is provided until the next line start signal is provided is also referred to as a "line reading period".

The output controller 515 converts the line image data provided to the output controller 515 from the line sensor 21 to digital data. Among the converted group of line image data, the line image data which satisfy a predetermined condition are transferred to the processor 53 by the output controller 515. The line image data which do not satisfy the predetermined condition are destroyed without being transferred to the processor 53 by the output controller 515.

Particularly, the output controller 515 transfers, without destruction, the line image data to the processor 53. The line image data is generated in the line sensor 21 by the reading operation (accumulating operation of the signal charge utilizing a photoelectric effect by the group of light receiving elements 211), during one or a plurality of line reading periods from when a High signal as the RSI signal is provided to the reading front end 51 until when a High signal as a later-explained memory full signal is provided from the processor 53 to the reading front end 51. The output controller 515 destroys the line image data including the signal charge information accumulated in the group of light receiving elements 211 before the High signal as the RSI signal is provided to the reading front end 51. The output controller 515 also destroys the line image data including the signal charge information accumulated in the group of light receiving elements 211 after the High signal as the memory full signal is provided to the reading front end 51.

The output controller 515 regards as valid the reading operations which start during or after the initial line reading period immediately after the High signal is provided as the RSI signal. The output controller 515 sequentially provides (transfers) to the processor 53 the line image data outputted from the line sensor 21 after the end of the initial line reading period. The line image data includes those outputted from the line sensor 21 corresponding to the initial line reading period. Also, the output controller 515 destroys the line image data based on the reading operation during one or a plurality of the line reading periods on and after the input of the line start signal immediately after the High signal is provided as the memory full signal. In other words, the output controller 515 invalidates the reading operation from the input of the last line start signal.

The processor 53 applies image processing such as shading correction, gamma correction, and so on, to the line image data provided from the reading front end 51 (output controller 515), and outputs the line image data after the correction by these image processing. The corrected line image data is stored in the RAM 15. The line image data provided from the reading front end 51 to the processor 53 is temporarily stored in the buffer 55 until after the line image data is outputted from the processor 53. As to the buffer 55, a memory with large storage capacity is unable to be installed because of the manufacturing cost. Therefore, due to delay in image processing, the buffer 55 may sometimes be full and unable to temporarily store the line image data outputted from the reading front end 51.

In order to cope with such situation, the processor 53, after started, provides a memory full signal to each portion inside the ASIC 40 so as to interrupt or restart the processes inside the ASIC 40 depending on an amount of free space in the buffer 55. Particularly, the processor 53 executes a free space determination process shown in FIG. 4 to switch the memory full signal provided to each portion inside the ASIC 40 between High and Low based on the amount of free space in the buffer 55.

Figure 4:
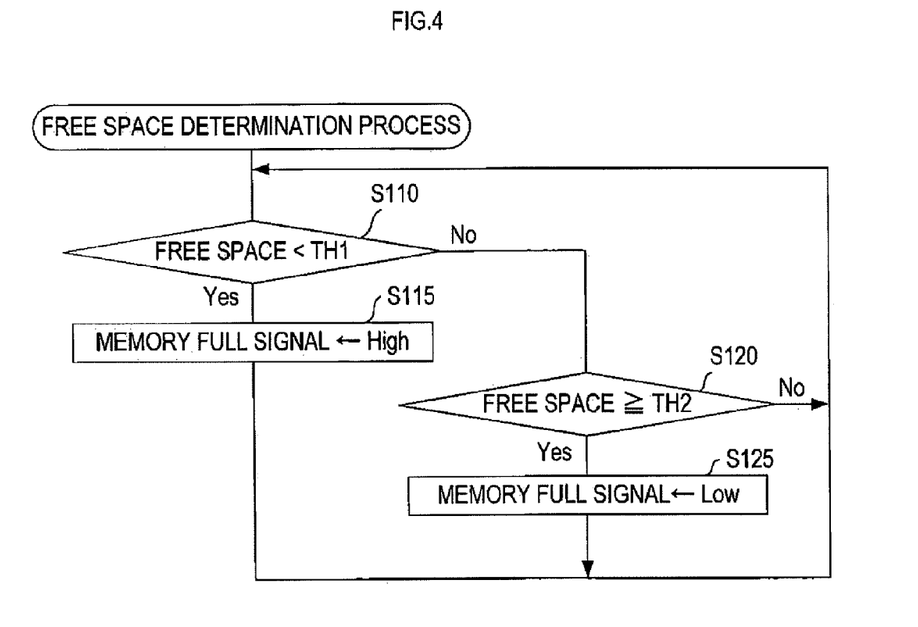
FIG. 4 is a flowchart illustrating a free space determination process in an image data processor 53.

When the process in FIG. 4 is started, the processor 53 determines whether or not the amount of free space in the buffer 55 is less than a preset threshold TH1 (S110). If the amount of free space in the buffer 55 is less than the threshold TH1 (S110: Yes), the memory full signal is switched to High (S115). The process moves to S110. If the memory full signal is already High in S115, the process moves to S110, keeping the High signal. On the other hand, if the free space in the buffer 55 is not less than the threshold TH1 (S110: No), the processor 53 determines whether or not the amount of free space in the buffer 55 is not less than a preset threshold TH2 (S120). The threshold TH2 is a larger value than the threshold TH1 and prestored in a not shown register.

If the amount of free space in the buffer 55 is not less than the threshold TH2 (S120: Yes), the memory full signal is switched to Low (S125). The process moves to S110. If the memory full signal is already Low in S125, the process moves to S110, keeping the Low signal. The processor 53 repeatedly executes these steps to switch the memory full signal between High and Low, until a main controller 65 is paused.

Next, the constitution of the motor controller 60 will be described. The motor controller 60, as shown in FIG. 3, includes an FB signal processor 61, an ADF signal processor 63, the main controller 65, a timer 67, a conveyance time measurer 68 and a reading start instruction signal generator 69.

The processor 61 includes a position detector 611 and a speed detector 612. The position detector 611 detects a conveyance position X as a position in the sub-scanning direction of the line sensor 21 based on pulsed encoder signals (A-phase signal and B-phase signal) provided from the FB encoder 29. The speed detector 612 detects a conveyance speed V as a moving speed of the line sensor 21. The position detector 611 and the speed detector 612 detect the conveyance position X and speed V of the line sensor 21 in a known technique. For example, the position detector 611, based on the A-phase signal and the B-phase signal of the FB encoder 29, detects a moving direction of the line sensor 21 and updates the conveyance position X as a position of the line sensor 21 each time a leading edge of the A-phase signal is detected. The processor 61 provides to the main controller 65 information on the detected conveyance position X and speed V.

The processor 63 includes a position detector 631 and a speed detector 632. The position detector 631 detects a conveyance position X as a position of a document based on pulsed encoder signals (A-phase signal and B-phase signal) provided from the ADF encoder 39. The speed detector 632 detects a conveyance speed V as a moving speed of the document. For example, the position detector 631, based on the A-phase signal and the B-phase signal of the ADF encoder 39, detects a moving direction of the document and updates the conveyance position X as a position of the document each time a leading edge of the A-phase signal is detected. The processor 63 provides to the main controller 65 information on the detected conveyance position X and speed V.

The main controller 65 controls the FB motor 25 and the ADF motor 35 based on the information on the conveyance position X and speed V respectively provided from the processor 61 and the processor 63. For example, in the case of the ADF reading mode, after executing initial processing of arranging the line sensor 21 below the platen glass 103B (particularly, below the document presser 317), the main controller 65 sets the ADF motor 35 as a target motor to be driven. The main controller 65 then determines a manipulated variable to the ADF motor 35 based on the information on the conveyance position X and speed V provided from the processor 63, thereby making the driving circuit 37 drive the ADF motor 35 at a driving current/voltage corresponding to the manipulated variable. In this manner, conveyance control is achieved upon conveying in the sub-scanning direction the document as an object to be conveyed in the ADF reading mode.

In the case of the FB reading mode, the main controller 65 sets the FB motor 25 as the target motor to be driven. The main controller 65 then determines a manipulated variable to the FB motor 25 based on the information on the conveyance position X and speed V provided from the processor 61, thereby making the driving circuit 27 drive the FB motor 25 at a driving current/voltage corresponding to the manipulated variable. In this manner, conveyance control is achieved upon conveying in the sub-scanning direction the line sensor 21 as an object to be conveyed in the FB reading mode.

Details of the process executed by the main controller 65 will be explained by way of FIG. 5. The main controller 65, when started and starting a process shown in FIG. 5, executes initial processing (S210). The initial processing includes resetting the timer 67 that counts elapsed time from a start time, and placing the line sensor 21 at an initial position. Particularly, in the ADF reading mode, the line sensor 21 is placed at a document reading position below the platen glass 103B. In the ADF reading mode, a document is separated from the document tray 113.

After the initial processing, the main controller 65 stores and holds the current position of the object to be conveyed as a control start position Xst (S215), and sets a reading start time Trs (S220). In the present embodiment, at the timing when the time indicated by the timer 67 coincides with the time Trs, the generator 69 temporarily switches the RSI signal from Low to High, thereby to validate the reading operation of the line sensor 21. In S220, the timing when the RSI signal is switched to High as above is set as the time Trs. The initial time Trs is set to a time when the object to be conveyed reaches the origin of a reading area. The object to be conveyed herein indicates the line sensor 21 in the case of the FB reading mode, and the document in the case of the ADF reading mode.

The time when the object to be conveyed reaches the origin of the reading area can be calculated from the target position trajectory of the object to be conveyed. In the present embodiment, the object to be conveyed is controlled to be accelerated to the predetermined speed Vc, and then conveyed at a constant speed. As the target position trajectory upon this conveyance control, target position trajectories in an acceleration section and a constant speed section are predefined in the main controller 65.

For example, the target position trajectory (trajectory of the target position Xr) in the acceleration section is defined as follows:

$$Xr(T) = AT^2/2 + Xst$$

where the constant A indicates acceleration, the variable T indicates time elapsed from the start time of conveyance control, Xst indicates a position (control start position) of the object to be conveyed at the start time of conveyance control based on the target position trajectory.

If a target speed in the constant speed section is set as the speed Vc, a time length in the acceleration section (acceleration time) Ta is calculated by the following equation:

$$Ta = Vc/A$$

The speed Vc and the constant A are prestored in a not shown register, according to the reading resolution and driving conditions.

Also, the target position trajectory in the constant speed section following the acceleration is defined as:

$$Xr(T) = Vc(T - Ta) + Xa$$

where Xa is the target position Xr at the end of the acceleration section, and Xa=Xst+Da. Da is an acceleration distance (Da=A×Ta²/2).

The main controller 65, based on the target position trajectory from the position Xst set in S215 and the reading area, calculates the time when the object to be conveyed reaches the origin of the reading area. The calculated time is set to the generator 69 as the time Trs.

When the steps of S215 and S220 are ended, the main controller 65 resets the timer 67, and then starts the timer 67 to measure time from zero (S230). The main controller 65, by resetting and restarting the timer 67, makes the timer 67 measure the time T elapsed from the start time of conveyance control and starts control of the motor to be driven based on the above-noted target position trajectories including the acceleration section and the constant speed section and the conveyance position X of the object to be conveyed detected by the processor 61, 63 (S235). In other words, the object to be conveyed is accelerated from the position Xst to the predetermined speed Vc according to the above-noted target position trajectories, and then a constant speed conveyance control process is executed (S235). In the constant speed conveyance control process, the object to be conveyed is conveyed at a constant speed. The motor to be driven herein is the FB motor 25 in the case of the FB reading mode, and the ADF motor 35 in the case of the ADF reading mode.

Particularly, in S235, a manipulated variable U is calculated which converges, to zero, a deviation $E=X-Xr$ between the target position $Xr(T)$ at a current time T elapsed from the start time for conveyance control and the current conveyance position X of the object to be conveyed detected by the processor 61, 63. The calculated manipulated variable U is set to the driving circuit 27, 37 corresponding to the motor to be driven. As a result, the motor to be driven is driven by the driving circuit 27, 37 at the driving current/voltage corresponding to the manipulated variable U. The control system may combine a position feedback system and a speed feedback system. The manipulated variable U can be calculated based on the current conveyance position X and speed V of the object to be conveyed detected by the processor 61, 63.

After starting the constant speed conveyance control process, the main controller 65 determines, while continuing the constant speed conveyance control process, whether or not the memory full signal sequentially provided from the reading controller 50 (processor 53) has switched from Low to High (S240). It is further determined whether or not reading operation for the overall reading area has been complete (S245). When the reading operation for the overall reading area has been complete (S245: Yes), a predetermined end process is executed (S290). Particularly, when the reading mode is the FB reading mode, the line sensor 21 as the object to be conveyed is decelerated/stopped by motor control, and the stopped line sensor 21 is conveyed to its home position in the end process. When the reading mode is the ADF reading mode, the document is discharged in the end process. Thereafter, the main controller 65 is paused.

Figure 5:
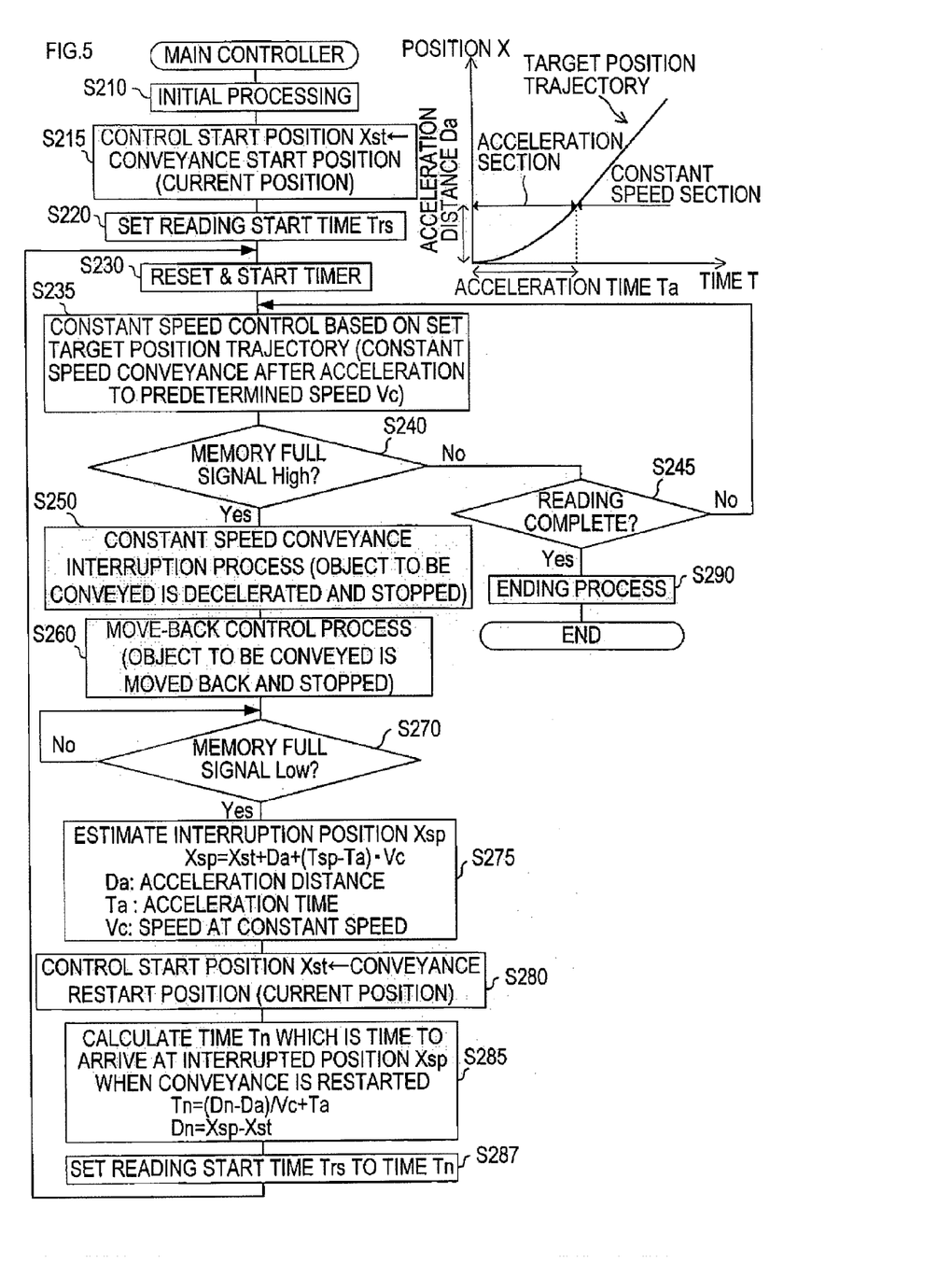
FIG. 5 is a flowchart illustrating a process executed by a main controller 65.
Figure 6:
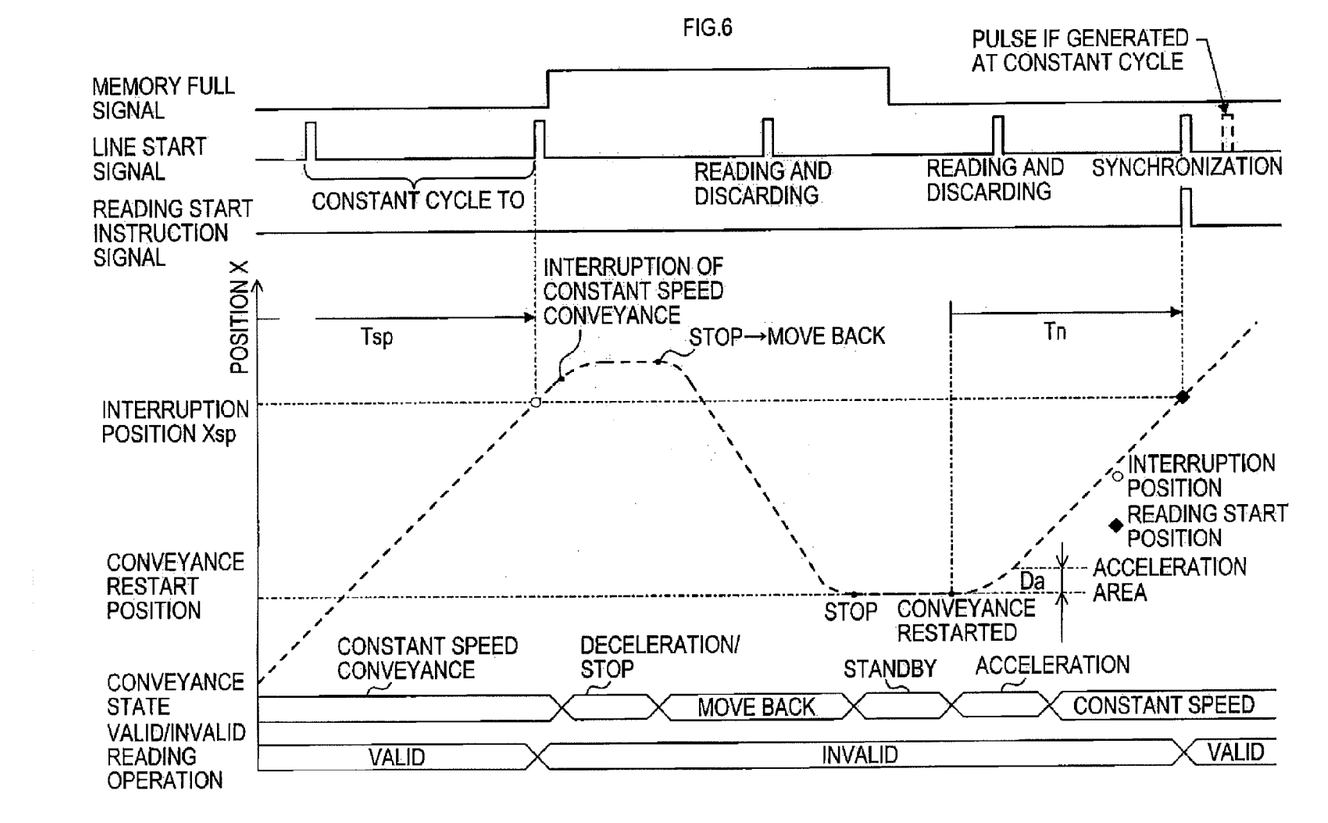
FIG. 6 is a time chart showing conveyance modes and reading modes.

When it is determined, as shown in FIG. 6, that the memory full signal is switched from Low to High (S240 in FIG. 5: Yes), the main controller 65 interrupts the constant speed conveyance control process and executes a process that decelerates/stops the object to be conveyed by motor control (S250). Particularly, based on the target position trajectory upon deceleration and the conveyance position X and speed V of the object to be conveyed detected by the processor 61, 63, the object to be conveyed is smoothly decelerated/stopped according to the preset target position trajectory upon deceleration.

When this process is ended, the main controller 65 controls the motor to be driven based on the target position trajectory upon moving back and the conveyance position X and speed V of the object to be conveyed detected by the processor 61, 63, so as to place the object to be conveyed at a position moved back from the stopped position of the object to be conveyed by the step of S250 to an upstream in a conveyance direction thereof by a predetermined distance (S260). Particularly, the move-back distance of the object to be conveyed can be defined as $Dd+Da+\alpha$, where Dd is a distance (deceleration distance) the object to be conveyed has moved from when the object to be conveyed is decelerated by the step of S250 to when the object to be conveyed is stopped, Da is a distance (acceleration distance) the object to be conveyed has moved in a section where the object to be conveyed is accelerated according to the target position trajectory used in S235, and $\alpha$ is a predetermined redundant quantity. The redundant quantity $\alpha$ is used because it is necessary to restart valid reading operation by the line sensor 21 from a position where the object to be conveyed has been present upon input of the line start signal immediately before the memory full signal is switched to High to interrupt the constant speed conveyance control process. In other words, the step of S260 moves back the object to be conveyed from the restart position of the valid reading operation by the line sensor 21 to the conveyance restart position which is moved back by a distance not less than a distance corresponding to the acceleration distance Da, thereby placing the object to be conveyed at the conveyance restart position.

Due to an event that the memory full signal is switched from Low to High, a value (time T) of the timer 67 at an interrupted time is stored and held in the measurer 68 as information of the conveyance time Tsp.

The interrupted time herein indicates a time point prior to the timing when the memory full signal is switched from Low to High, and also when the line start signal is provided from the signal generator 511 to the line sensor 21 for the last time. The same definition is applied also to the "interrupted time" hereinafter. Here, by way of FIG. 7, details of the measurer 68 will be described.

Figure 7:
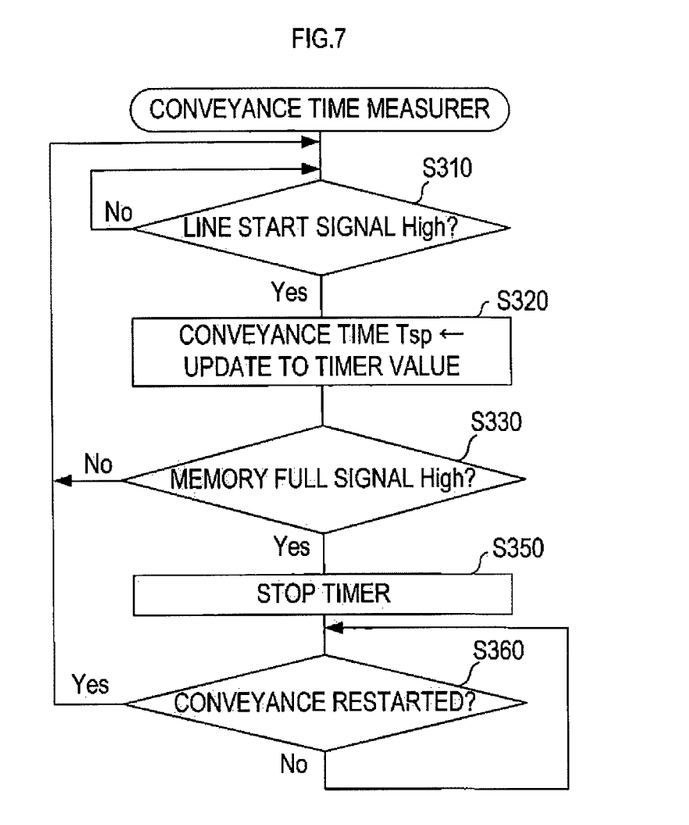
FIG. 7 is a flowchart showing a process executed by a conveyance time measurer 68.

The measurer 68, when started, executes a process shown in FIG. 7. As shown in FIG. 7, each time a leading edge of the line start signal provided from the signal generator 511 is detected (S310: Yes), the measurer 68 updates the conveyance time Tsp to the current time T (i.e., elapsed time from when the conveyance control is started) indicated by the timer 67 at the time of detection (S320). When the memory full signal is switched from Low to High (S330: Yes), the timer 67 is stopped (S350). Thereafter, the measurer 68 stands by until the memory full signal is switched from High to Low and the conveyance control from the conveyance restart position of the object to be conveyed is started (S360). When the memory full signal is switched from High to Low and the conveyance control from the conveyance restart position is started (S360: Yes), the process moves to S310. The subsequent process is executed.

The measurer 68 executes the above-described process until the main controller 65 is paused. By this operation, the measurer 68 stores and holds a value of the timer 67 (time T) as information of the conveyance time Tsp. The value of the timer 67 (time T) herein indicates a value of the timer 67 (time T) at a time when the line start signal is provided from the signal generator 511 to the line sensor 21 for the last time before the timing when the memory full signal is switched from Low to High.

Turning back to the process of the main controller 65, the main controller 65, when the step of S260 is ended, stands by until the memory full signal is switched from High to Low (S270). When the memory full signal is switched from High to Low, the main controller 65 estimates, according to the following expression, an interrupted position Xsp which is the conveyance position of the object to be conveyed at the interrupted time, based on the conveyance time Tsp held by the measurer 68 at the time and the position Xst stored in advance.

$$Xsp=Xst+Da+(Tsp-Ta)\cdot Vc$$

As previously explained, Da indicates the conveyance distance (acceleration distance) in the acceleration section in the target position trajectory. Ta indicates the time length (acceleration time) in the acceleration section. Vc indicates the target speed of the object to be conveyed in the constant speed section.

In this manner, in the present embodiment, the target position Xr (Tsp) at the time when the conveyance time Tsp, held by the measurer 68, has elapsed is estimated as the interrupted position Xsp (S275). The conveyance time Tsp is the time elapsed from when the conveyance control is started.

When this process is ended, the main controller 65 sets the conveyance restart position, which is the current position of the object to be conveyed, as the position Xst (S280). Based on the target position trajectory from the updated position Xst, a time Tn which is time when the object to be conveyed arrives at the interrupted position Xsp is calculated (S285). The time Tn is the time based on the start time of the conveyance control (time elapsed from when the conveyance control is started). Then, a result of the calculation is set to the generator 69 as the time Trs (S287).

Particularly, the time Tn can be calculated according to the following equations:

$$Tn=(Dn-Da)/Vc+Ta$$

where Dn indicates a distance from the position Xst, which is the conveyance restart position, to the interrupted position Xsp; and $$Dn=Xsp-Xst$$

where Da indicates the conveyance distance (acceleration distance) from the conveyance restart position to where the acceleration section is ended, and Ta indicates the time length (acceleration time) from the conveyance restart position to where the acceleration section is ended.

After the time Trs is set in S287, the process moves to S230. The main controller 65 resets and starts the timer 67, and also executes constant speed conveyance control from the position Xst (conveyance restart position) using the target position trajectory similar to that for the conveyance control from the initial position.

In the above, process operation of the main controller 65 has been described. When the main controller 65 starts the step of S230 after the step of S287, the RSI signal provided from the generator 69 to the reading front end 51 is temporarily switched from Low to High, at the time Trs when the object to be conveyed reaches the interrupted position Xsp.

Figure 8:
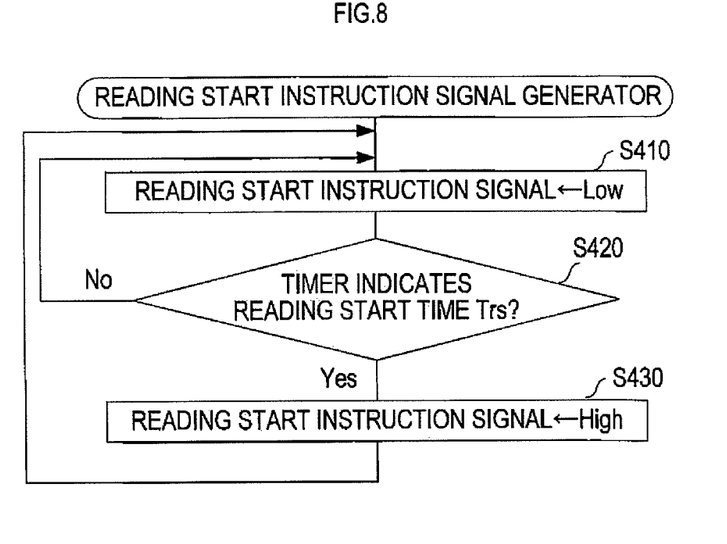
FIG. 8 is a flowchart showing a process executed by a reading start instruction signal generator 69.

The generator 69, when started, sets the RSI signal to Low, as shown in FIG. 8 (S410). The RSI signal is to be provided to the reading front end 51. In this state, the generator 69 stands by until the value of the timer 67 coincides with the time Trs preset by the main controller 65 (S420: No). When the value of the timer 67 coincides with the time Trs (S420: Yes), the RSI signal is switched from Low to High (S430). Thereafter, the process returns to S410. The RSI signal is switched to Low again. The generator 69 executes this process repeatedly.

Accordingly, when the constant speed conveyance control process is started, a High signal is outputted from the generator 69 to the reading front end 51 as the RSI signal at the time when the object to be conveyed reaches the interrupted position Xsp, as shown in FIG. 6. In this case, the line start signal is provided from the signal generator 511 to the line sensor 21 at the time when the object to be conveyed has reached the interrupted position Xsp. From the time when the line start signal is provided, reading operation by the line sensor 21 is restarted.

Also, the output controller 515, as a result that the RSI signal is switched to High, stops destructing the line image data generated by the reading operation by the line sensor 21, and provides to the processor 53 the line image data generated by the reading operation by the line sensor 21 after the RSI signal is switched to High.

Thus, according to the image reading apparatus 1 of the present embodiment, a position corresponding to the line where the reading operation is invalidated by the switching of the memory full signal to High can be identified with precision. Valid reading operation is executed from the identified position. The line image data generated by the reading operation is combined with the line image data generated before then so that the read image data of the document can be generated with high image quality.

According to the image reading apparatus 1 of the present embodiment, without configuring an image reading apparatus such that the line start signal is synchronized with the encoder signal as before, image degradation of the read image data before and after the interruption (i.e., before and after switching between valid/invalid reading operation) can be inhibited. The read image data of the document can be generated with high image quality.

In detail, according to the present embodiment, the interrupted position is specified based on the target position trajectory Xr(T) and not on the position detected by the processor 61, 63 which detects the position based on the encoder signal. In this case, the interrupted position can be more precisely specified than the case where the encoder signal and the line start signal are in non-synchronization and the interrupted position is specified based on the position detected by the processor 61, 63. Also, upon restarting the valid reading operation, time when the object to be conveyed passes the interrupted position is specified based on the target position trajectory Xr(T). In this case, the valid reading operation can be started from the interrupted position with higher precision than the case where the time when the object to be conveyed passes the interrupted position is specified based on the position detected by the processor 61, 63. Especially according to the present embodiment, the line start signal is forcibly outputted from the signal generator 511 at the time when the object to be conveyed passes the interrupted position. Thus, the valid reading operation can be restarted from the interrupted position with high precision.

According to the present embodiment, image degradation of the read image data before and after the interruption (i.e., before and after switching between valid/invalid reading operation) can be inhibited. Generation of read image data of the document can be achieved with high image quality.

The embodiment of the present invention has been described in the above. Now, correspondence relations between the terms will be described. Particularly, the signal generator 511 in the above-described embodiment corresponds to an example of the signal output unit.

The line sensor 21 corresponds to an example of the reading unit. Either the conveyance mechanism 23 or the conveyance mechanism 31 corresponds to an example of the conveyance unit. Either the position detector 611 or 631 corresponds to an example of the position detecting unit.

The conveyance control unit is implemented, as an example, by the step of S235 executed by the main controller 65, the setting operation of the time Trs (S220 and S287) and the operation of the generator 69. The position specifying unit is implemented, as an example, by the timer 67 (corresponding to an example of the timer unit), the measurer 68 (corresponding to an example of the time specifying unit) and the step of S275 executed by the main controller 65. In the above-described embodiments, the interruption condition is determined satisfied when the memory full signal is switched to High.

The conveyance interrupting unit is implemented, as an example, by the step of S250 executed by the main controller 65. The move-back control unit is implemented, as an example, by the step of S260 executed by the main controller 65. The estimation unit is implemented, as an example, by the step of S285 executed by the main controller 65. The condition determining unit is implemented, as an example, by the steps of S240 and S270.

The present invention is not limited to the above-described embodiment and can take various forms. For example, in the above-described embodiment, when the memory full signal is switched to High, the line image data is destructed in the output controller 515 to invalidate the reading operation thereafter. The image reading apparatus 1, for example, may be configured to stop providing the line start signal to the line sensor 21 thereby interrupting the reading operation by the line sensor 21, when the memory full signal is switched to High.

What is claimed is:

1. An image reading apparatus comprising:
    a reading unit that reads a document as an object to be read in a main scanning direction;
    a conveyance unit that conveys one of the reading unit and the object to be read as an object to be conveyed in a sub-scanning direction;
    a position detecting unit that detects a position of the object to be conveyed;
    a conveyance control unit that controls conveyance of the object to be conveyed by the conveyance unit based on the position of the object to be conveyed detected by the position detecting unit and a preset target position trajectory;
    a position specifying unit that specifies, based on the target position trajectory, the position of the object to be conveyed at a time when a period of invalidation or interruption of reading operation by the reading unit is started, the reading operation being invalidated or interrupted when a predetermined interruption condition is satisfied.

2. The image reading apparatus according to claim 1, wherein
    the position specifying unit includes:
        a time specifying unit that specifies elapsed time from a conveyance start time when the conveyance of the object to be conveyed is started by the conveyance unit and the conveyance control unit until when the period of invalidation or interruption of the reading operation is started,
    wherein, based on the elapsed time specified by the time specifying unit and the target position trajectory from a conveyance start position where the conveyance of the object to be conveyed is started, the position of the object to be conveyed is specified at a time when the period of invalidation or interruption of the reading operation is started.

3. The image reading apparatus according to claim 2, further comprising:
    a timer unit that measures time elapsed from the conveyance start time,
    wherein the time specifying unit specifies elapsed time from the conveyance start time until when the period of invalidation or interruption of the reading operation is started, based on a result of measurement by the timer unit.

4. The image reading apparatus according to claim 1, wherein
    the conveyance control unit makes the conveyance unit accelerate the object to be conveyed from a conveyance start position where the conveyance of the object to be conveyed is started to a predetermined speed and then convey the object to be conveyed at a constant speed, and
    the position specifying unit specifies the position of the object to be conveyed at a time when the period of invalidation or interruption of the reading operation is started, based on the target position trajectory from the conveyance start position.

5. The image reading apparatus according to claim 1, further comprising:
    a signal output unit that outputs a line start signal,
    wherein the reading unit reads the document as the object to be read in the main scanning direction each time the line start signal is provided from the signal output unit, and
    the position specifying unit specifies, based on the target position trajectory, the position of the object to be conveyed at a time when the line start signal which defines the reading operation to be invalidated or interrupted is outputted.

6. The image reading apparatus according to claim 5, further comprising:
    a time specifying unit that specifies elapsed time from a conveyance start time when the conveyance of the object to be conveyed is started by the conveyance unit and the conveyance control unit until when the line start signal which defines the reading operation to be invalidated or interrupted is outputted,
    wherein, based on the elapsed time specified by the time specifying unit and the target position trajectory from a conveyance start position where the conveyance of the object to be conveyed is started, the position is specified of the object to be conveyed at a time when the elapsed time has elapsed from the conveyance start time.

7. The image reading apparatus according to claim 6, further comprising:
    a timer unit that measures time elapsed from the conveyance start time,
    wherein the time specifying unit specifies elapsed time from the conveyance start time until when the line start signal which defines the reading operation to be invalidated or interrupted is outputted, based on a result of measurement by the timer unit.

8. The image reading apparatus according to claim 5, wherein the signal output unit periodically outputs the line start signal.

9. The image reading apparatus according to claim 1, wherein
    the conveyance unit includes a motor and conveys the object to be conveyed by means of a driving force generated by the motor,
    the conveyance control unit controls the motor to control the conveyance of the object to be conveyed by the conveyance unit.

10. The image reading apparatus according to claim 1, further comprising:
    a conveyance interrupting unit that, when the interruption condition is satisfied, interrupts conveyance control of the object to be conveyed by the conveyance control unit to stop the object to be conveyed.

11. The image reading apparatus according to claim 10, further comprising:
a move-back control unit that, based on the position of the object to be conveyed detected by the position detecting unit after the object to be conveyed is stopped by the conveyance interrupting unit, moves back the object to be conveyed to a conveyance restart position which is a position moved back more than a distance corresponding to a predetermined moving distance according to the target position trajectory from an interrupted position which is the position specified by the position specifying unit, so as to place the object to be conveyed at the conveyance restart position.

12. The image reading apparatus according to claim 11, further comprising:
an estimation unit that estimates time until when the object to be conveyed reaches the interrupted position from the conveyance restart position, when the conveyance control unit conveys the object to be conveyed from the conveyance restart position.

13. The image reading apparatus according to claim 12, further comprising:
a signal output unit that outputs a line start signal,
wherein the reading unit reads the document as the object to be read in the main scanning direction each time the line start signal is provided from the signal output unit.

14. The image reading apparatus according to claim 13, wherein
the conveyance control unit, when a predetermined restart condition is satisfied, controls the conveyance unit so that the object to be conveyed is conveyed according to the target position trajectory from the conveyance restart position, and, by making the signal output unit periodically output the line start signal when and after the time estimated by the estimation unit has elapsed from when the conveyance has restarted, validates or restarts the reading operation by the reading unit from when and after the line start signal is outputted.

15. The image reading apparatus according to claim 14, wherein
the conveyance control unit makes the conveyance unit accelerate the object to be conveyed from a conveyance start position where the conveyance of the object to be conveyed is started to a predetermined speed and then convey the object to be conveyed at a constant speed, and
the conveyance interrupting unit, when the interruption condition is satisfied, interrupts the conveyance of the object to be conveyed.

16. The image reading apparatus according to claim 15, wherein
the conveyance restart position is a position moved back from the interrupted position more than a distance corresponding to a moving distance in an acceleration section according to the target position trajectory, the acceleration section corresponding to a section where the object to be conveyed is accelerated.

17. The image reading apparatus according to claim 1, wherein
the position detecting unit detects a conveyance position of the object to be conveyed, based on an encoder signal provided from an encoder which outputs the encoder signal corresponding to a move of the object to be conveyed.

18. The image reading apparatus according to claim 1, further comprising:

a condition determining unit that determines whether or not the interruption condition is satisfied, based on an amount of free space in a buffer that stores read image data generated by the reading operation by the reading unit.

19. The image reading apparatus according to claim 14, further comprising:
a condition determining unit that determines whether or not the interruption condition and the restart condition are satisfied, respectively, based on an amount of free space in a buffer that stores read image data generated by the reading operation by the reading unit.

20. An image reading apparatus comprising:
a signal output unit that periodically outputs a line start signal,
a reading unit that, in receipt of input of the line start signal from the signal output unit, reads a document as an object to be read in a main scanning direction each time the line start signal is provided;
a conveyance unit that includes a motor and conveys one of the reading unit and the object to be read as an object to be conveyed in a sub-scanning direction by means of a driving force generated by the motor;
a position detecting unit that detects a position of the object to be conveyed by the conveyance unit;
a conveyance control unit that drives and controls the motor based on the position of the object to be conveyed detected by the position detecting unit and a preset target position trajectory, thereby controlling the conveyance of the object to be conveyed by the conveyance unit according to the target position trajectory;
a position specifying unit including:
a timer unit that measures time elapsed from when the conveyance by the conveyance control unit is started; and
a time specifying unit that, based on a result of measurement by the timer unit, specifies elapsed time from when the conveyance of the object to be conveyed is started by the conveyance control unit until output of the line start signal where, in response to reading operation by the reading unit invalidated or interrupted as a result that a predetermined interruption condition is satisfied, the invalidation or interruption is conducted,
wherein the position specifying unit, based on the elapsed time specified by the time specifying unit and the target position trajectory from a conveyance start position where the conveyance of the object to be conveyed is started, specifies the position of the object to be conveyed at a time of output of the line signal where the invalidation or interruption is conducted;
a conveyance interrupting unit that, when the interruption condition is satisfied, drives and controls the motor so as to interrupt the conveyance of the object to be conveyed by the conveyance control unit and stop the object to be conveyed;
a move-back control unit that, based on the position of the object to be conveyed detected by the position detecting unit after the object to be conveyed is stopped by the conveyance interrupting unit, moves back the object to be conveyed to a conveyance restart position which is a position moved back more than a distance corresponding to a predetermined moving distance according to the target position trajectory from an interrupted position which is the position specified by the position specifying unit, so as to place the object to be conveyed at the conveyance restart position; and an estimation unit that estimates time until when the object to be conveyed reaches the interrupted position from the conveyance restart position, when the conveyance control unit conveys the object to be conveyed from the conveyance restart position, wherein the conveyance control unit, when a predetermined restart condition is satisfied, drives and controls the motor so that the object to be conveyed is conveyed according to the target position trajectory from the conveyance restart position, and, by making the signal output unit periodically output the line start signal at a time when the time estimated by the estimation unit has elapsed from when the conveyance has restarted the conveyance restart position, makes the signal output unit periodically output the line start signal from the time thereafter and validates or restarts the reading operation by the reading unit from the time.

* * * * *